United States Patent
Sampath et al.

(10) Patent No.: US 9,705,656 B2
(45) Date of Patent: Jul. 11, 2017

(54) SYSTEMS AND METHODS FOR PEER-TO-PEER AND AP TRAFFIC MULTIPLEXING

(71) Applicant: QUALCOMM Incorporated, San Diego, CA (US)

(72) Inventors: Hemanth Sampath, San Diego, CA (US); Bin Tian, San Diego, CA (US); Rahul Tandra, San Diego, CA (US); Gwendolyn Denise Barriac, Encinitas, CA (US); Yan Zhou, San Diego, CA (US); Sameer Vermani, San Diego, CA (US); Simone Merlin, Solana Beach, CA (US)

(73) Assignee: QUALCOMM Incorporated, San Diego, CA (US)

( * ) Notice: Subject to any disclaimer, the term of this patent is extended or adjusted under 35 U.S.C. 154(b) by 517 days.

(21) Appl. No.: 14/265,251

(22) Filed: Apr. 29, 2014

(65) Prior Publication Data

US 2014/0328261 A1     Nov. 6, 2014

Related U.S. Application Data

(60) Provisional application No. 61/870,696, filed on Aug. 27, 2013, provisional application No. 61/819,100, filed on May 3, 2013.

(51) Int. Cl.
    *H04L 5/00*      (2006.01)
    *H04W 72/04*     (2009.01)
    *H04W 76/02*     (2009.01)

(52) U.S. Cl.
    CPC .......... *H04L 5/0073* (2013.01); *H04L 5/0037* (2013.01); *H04L 5/0094* (2013.01);
    (Continued)

(58) Field of Classification Search
    CPC .......................... H04W 28/26; H04W 76/023
    See application file for complete search history.

(56) References Cited

U.S. PATENT DOCUMENTS

| 4,953,158 A | 8/1990 | Schreur |
| 7,596,113 B1 | 9/2009 | Kingston et al. |
| (Continued) | | |

FOREIGN PATENT DOCUMENTS

| JP | 2009194880 A | 8/2009 |
| JP | 2014147031 A | 8/2014 |
| (Continued) | | |

OTHER PUBLICATIONS

International Search Report and Written Opinion—PCT/US2014/036198—ISA/EPO—Nov. 27, 2014.
Taiwan Search Report—TW103115854—TIPO—Aug. 12, 2015.

*Primary Examiner* — Robert M Morlan
(74) *Attorney, Agent, or Firm* — Knobbe, Martens, Olson & Bear, LLP

(57) ABSTRACT

Systems, methods, and devices for concurrently allowing station-to-station transmissions and access point-to-station transmissions are described herein. In some aspects, a method comprises transmitting, to an access point, a request for an available channel frequency. The method further comprises receiving a coordination message from the access point. The coordination message may indicate that a first frequency channel is allocated for transmissions between a first device and a second device and that a second frequency channel is allocated for transmissions between a third device and a fourth device. The method further comprises transmitting a first data packet to the fourth device using the second frequency channel concurrently with a transmission of a second data packet between the first device and the second device using the first frequency channel.

29 Claims, 14 Drawing Sheets

(52) U.S. Cl.
CPC .... *H04W 72/0406* (2013.01); *H04W 72/0453* (2013.01); *H04W 76/023* (2013.01)

(56) References Cited

U.S. PATENT DOCUMENTS

| | | | |
|---|---|---|---|
| 7,936,774 B2 | 5/2011 | Kuperschmidt et al. | |
| 8,077,683 B2* | 12/2011 | Rudolf | H04W 72/0406 370/229 |
| 8,320,321 B2 | 11/2012 | Joshi et al. | |
| 8,514,821 B2 | 8/2013 | Park et al. | |
| 8,923,252 B2 | 12/2014 | Trainin et al. | |
| 2001/0012275 A1 | 8/2001 | Caldwell et al. | |
| 2004/0028018 A1 | 2/2004 | Cain | |
| 2004/0246934 A1 | 12/2004 | Kim | |
| 2005/0089000 A1 | 4/2005 | Bae et al. | |
| 2005/0141451 A1 | 6/2005 | Yoon et al. | |
| 2005/0157674 A1* | 7/2005 | Wentink | H04B 7/2126 370/328 |
| 2005/0226183 A1 | 10/2005 | Penumetsa | |
| 2006/0166683 A1 | 7/2006 | Sharma et al. | |
| 2007/0002809 A1 | 1/2007 | Reunamaki et al. | |
| 2007/0058659 A1 | 3/2007 | Ayyagari et al. | |
| 2007/0104138 A1* | 5/2007 | Rudolf | H04W 72/0406 370/329 |
| 2007/0286130 A1 | 12/2007 | Shao et al. | |
| 2009/0034489 A1 | 2/2009 | Adams et al. | |
| 2009/0067389 A1 | 3/2009 | Lee et al. | |
| 2009/0116444 A1 | 5/2009 | Wang et al. | |
| 2009/0232109 A1 | 9/2009 | Nandagopalan et al. | |
| 2010/0080266 A1 | 4/2010 | Zhang et al. | |
| 2010/0189048 A1 | 7/2010 | Baker et al. | |
| 2011/0069689 A1 | 3/2011 | Grandhi et al. | |
| 2011/0176522 A1 | 7/2011 | Choi et al. | |
| 2011/0310762 A1 | 12/2011 | Choi et al. | |
| 2012/0113975 A1 | 5/2012 | Kim et al. | |
| 2012/0117155 A1 | 5/2012 | Li et al. | |
| 2013/0089010 A1 | 4/2013 | Richardson et al. | |
| 2013/0170468 A1 | 7/2013 | Baker et al. | |
| 2013/0176161 A1 | 7/2013 | Derham et al. | |
| 2014/0204898 A1 | 7/2014 | Yang et al. | |
| 2014/0328262 A1 | 11/2014 | Sampath et al. | |

FOREIGN PATENT DOCUMENTS

| | | |
|---|---|---|
| TW | 201108778 A | 3/2011 |
| TW | 201244418 A | 11/2012 |
| WO | 2005067213 A1 | 7/2005 |
| WO | WO-2008010007 A1 | 1/2008 |

* cited by examiner

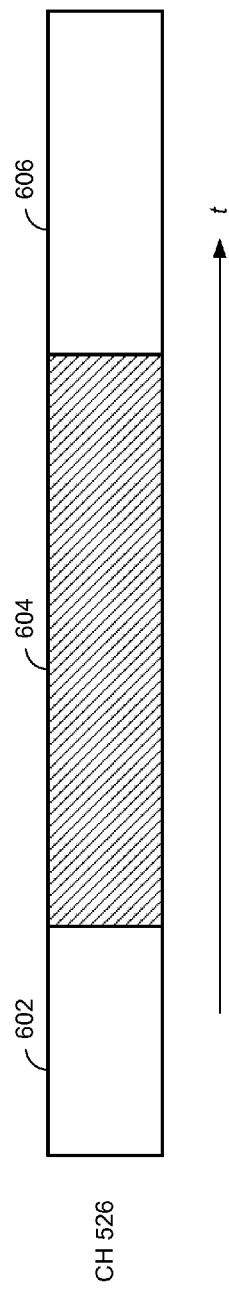
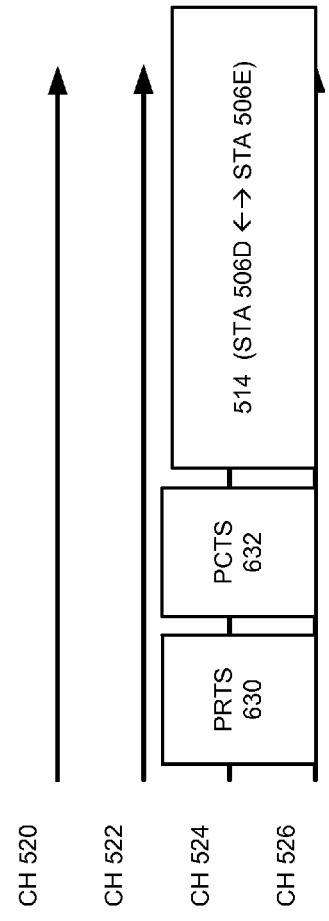
FIG. 6A
FIG. 6B

SYSTEMS AND METHODS FOR PEER-TO-PEER AND AP TRAFFIC MULTIPLEXING

CROSS-REFERENCE TO RELATED APPLICATIONS

This application claims priority under 35 U.S.C. §119(e) to U.S. Provisional Application No. 61/819,100, entitled "SYSTEMS AND METHODS FOR PEER-TO-PEER AND AP TRAFFIC MULTIPLEXING" and filed on May 3, 2013, and to U.S. Provisional Patent Application No. 61/870,696, entitled "SYSTEMS AND METHODS FOR PEER-TO-PEER AND AP TRAFFIC MULTIPLEXING" and filed on Aug. 27, 2013, both of which are hereby incorporated by reference in their entireties.

BACKGROUND

Field

The present application relates generally to wireless communications, and more specifically to systems, methods, and devices for peer-to-peer and access point traffic multiplexing.

Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

However, multiple wireless networks may exist in the same building, in nearby buildings, and/or in the same outdoor area. The prevalence of multiple wireless networks may cause interference, reduced throughput (e.g., because each wireless network is operating in the same area and/or spectrum), and/or prevent certain devices from communicating. Thus, improved systems, methods, and devices for communicating when wireless networks are densely populated is desired.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include improved communications between access points and stations in a wireless network.

One aspect of this disclosure provides a method for concurrently allowing devices to communicate. The method comprises transmitting, to an access point, a request for an available channel frequency. The method further comprises receiving a coordination message from the access point. The coordination message may indicate that a first frequency channel is allocated for transmissions between a first device and a second device and that a second frequency channel is allocated for transmissions between a third device and a fourth device. The method further comprises transmitting a first data packet to the fourth device using the second frequency channel concurrently with a transmission of a second data packet between the first device and the second device using the first frequency channel.

Another aspect of this disclosure provides an apparatus for concurrently allowing devices to communicate. The apparatus comprises means for transmitting, to an access point, a request for an available channel frequency. The apparatus further comprises means for receiving a coordination message from the access point. The coordination message may indicate that a first frequency channel is allocated for transmissions between a first device and a second device and that a second frequency channel is allocated for transmissions between a third device and a fourth device. The apparatus further comprises means for transmitting a first data packet to the fourth device using the second frequency channel concurrently with a transmission of a second data packet between the first device and the second device using the first frequency channel.

Another aspect of this disclosure provides a non-transitory computer-readable medium comprising code that, when executed, causes an apparatus to transmit, to an access point, a request for an available channel frequency. The medium further comprises code that, when executed, causes an apparatus to receive a coordination message from the access point. The coordination message may indicate that a first frequency channel is allocated for transmissions between a first device and a second device and that a second frequency channel is allocated for transmissions between a third device and a fourth device. The medium further comprises code that, when executed, causes an apparatus to transmit a first data packet to the fourth device using the second frequency channel concurrently with a transmission of a second data packet between the first device and the second device using the first frequency channel.

Another aspect of this disclosure provides an apparatus for concurrently allowing devices to communicate. The apparatus comprises a transmitter configured to transmit, to an access point, a request for an available channel frequency. The apparatus further comprises a receiver configured to receive a coordination message from the access point. The coordination message may indicate that a first frequency channel is allocated for transmissions between a first device and a second device and that a second frequency channel is allocated for transmissions between a third device and a fourth device. The transmitter may be further configured to transmit a first data packet to the fourth device using the second frequency channel concurrently with a transmission of a second data packet between the first device and the second device using the first frequency channel.

BRIEF DESCRIPTION OF THE DRAWINGS

FIG. 6A shows another timing diagram in which aspects of the present disclosure may be employed.

FIG. 6B shows another timing diagram in which aspects of the present disclosure may be employed.

DETAILED DESCRIPTION

Figure 1:
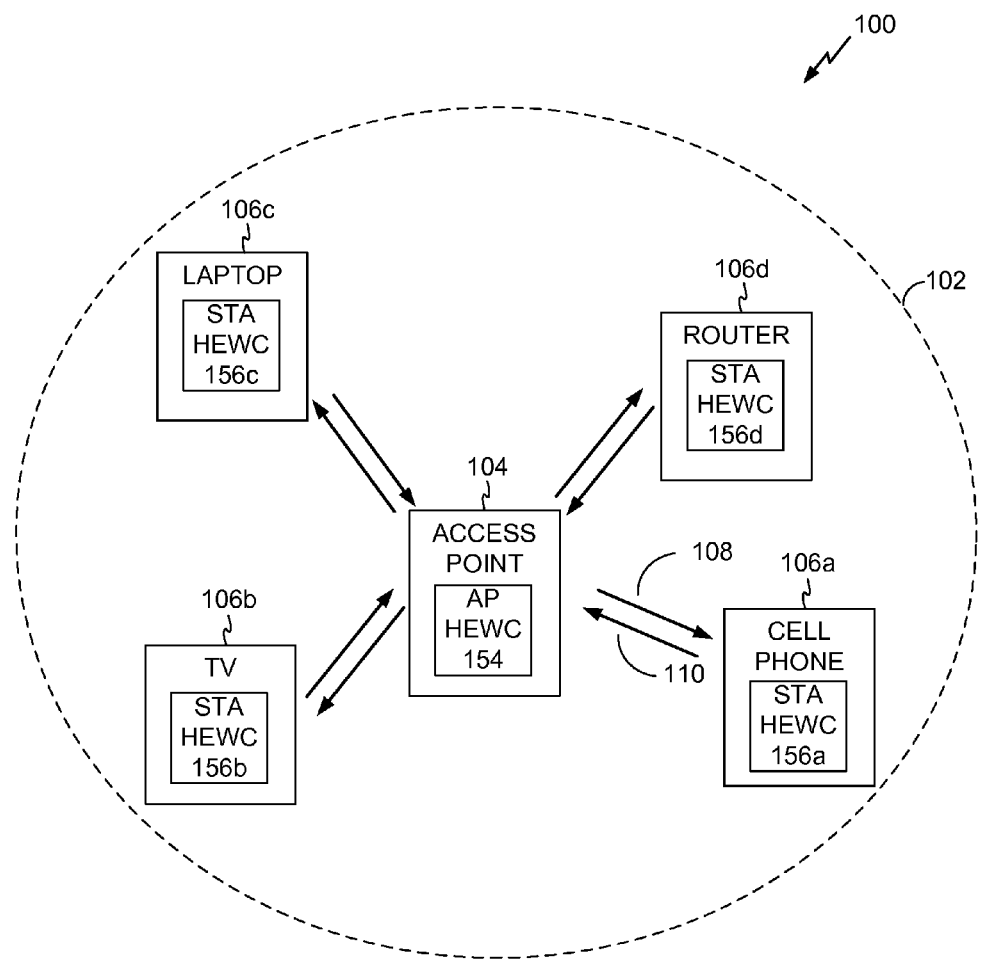
FIG. 1 shows an exemplary wireless communication system in which aspects of the present disclosure may be employed.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as a wireless protocol.

In some aspects, wireless signals may be transmitted according to a high-efficiency 802.11 protocol using orthogonal frequency-division multiplexing (OFDM), direct-sequence spread spectrum (DSSS) communications, a combination of OFDM and DSSS communications, or other schemes. Implementations of the high-efficiency 802.11 protocol may be used for Internet access, sensors, metering, smart grid networks, or other wireless applications. Advantageously, aspects of certain devices implementing the high-efficiency 802.11 protocol using the techniques disclosed herein may include allowing for increased peer-to-peer services (e.g., Miracast, WiFi Direct Services, Social WiFi, etc.) in the same area, supporting increased per-user minimum throughput requirements, supporting more users, providing improved outdoor coverage and robustness, and/or consuming less power than devices implementing other wireless protocols.

In some implementations, a WLAN includes various devices which are the components that access the wireless network. For example, there may be two types of devices: access points ("APs") and clients (also referred to as stations, or "STAs"). In general, an AP may serve as a hub or base station for the WLAN and an STA serves as a user of the WLAN. For example, an STA may be a laptop computer, a personal digital assistant (PDA), a mobile phone, etc. In an example, an STA connects to an AP via a WiFi (e.g., IEEE 802.11 protocol) compliant wireless link to obtain general connectivity to the Internet or to other wide area networks. In some implementations an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement a high-efficiency 802.11 standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

FIG. 1 shows an exemplary wireless communication system 100 in which aspects of the present disclosure may be employed. The wireless communication system 100 may operate pursuant to a wireless standard, for example a high-efficiency 802.11 standard. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with code division multiple access (CDMA) techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

In some aspects, a STA 106 may be required to associate with the AP 104 in order to send communications to and/or receive communications from the AP 104. In one aspect, information for associating is included in a broadcast by the AP 104. To receive such a broadcast, the STA 106 may, for example, perform a broad coverage search over a coverage region. A search may also be performed by the STA 106 by sweeping a coverage region in a lighthouse fashion, for example. After receiving the information for associating, the STA 106 may transmit a reference signal, such as an association probe or request, to the AP 104. In some aspects, the AP 104 may use backhaul services, for example, to communicate with a larger network, such as the Internet or a public switched telephone network (PSTN).

In an embodiment, the AP 104 includes an AP high-efficiency wireless component (HEWC) 154. The AP HEWC 154 may perform some or all of the operations described herein to enable communications between the AP 104 and the STAs 106 using the high-efficiency 802.11 protocol. The functionality of the AP HEWC 154 is described in greater detail below with respect to FIGS. 2B, 3, 4, 5A-C, 6A-B, 7-8, and 11-12.

Alternatively or in addition, the STAs 106 may include a STA HEWC 156. The STA HEWC 156 may perform some or all of the operations described herein to enable communications between the STAs 106 and the AP 104 using the high-frequency 802.11 protocol. The functionality of the STA HEWC 156 is described in greater detail below with respect to FIGS. 2B, 3, 4, 5A-C, 6A-B, 9-10, and 13-14.

Figure 2A:
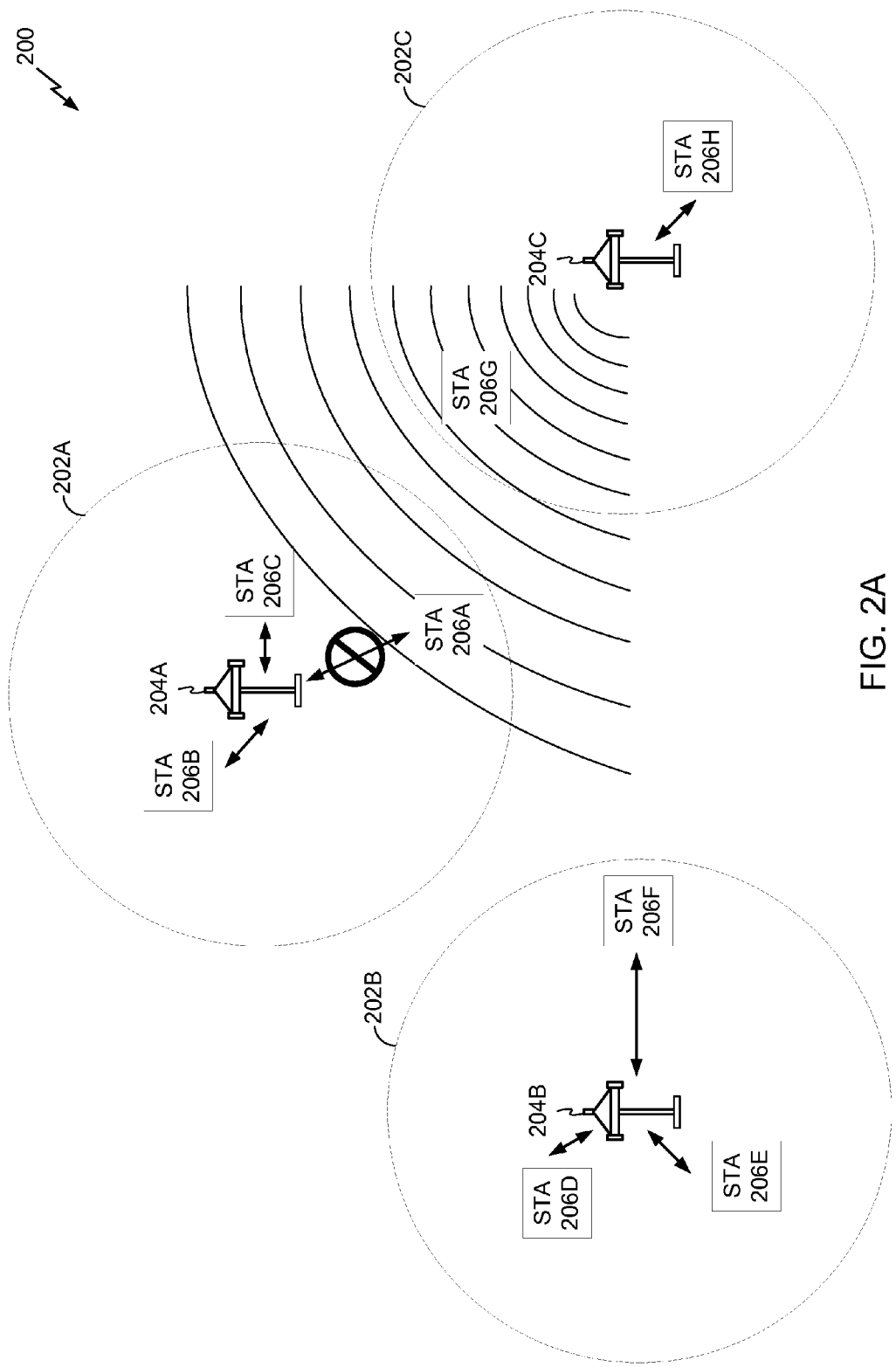
FIG. 2A shows a wireless communication system in which multiple wireless communication networks are present.

In some circumstances, a BSA may be located near other BSAs. For example, FIG. 2A shows a wireless communication system 200 in which multiple wireless communication networks are present. As illustrated in FIG. 2A, BSAs 202A, 202B, and 202C may be physically located near each other. Despite the close proximity of the BSAs 202A-C, the APs 204A-C and/or STAs 206A-H may each communicate using the same spectrum. Thus, if a device in the BSA 202C (e.g., the AP 204C) is transmitting data, devices outside the BSA 202C (e.g., APs 204A-B or STAs 206A-F) may sense the communication on the medium.

Generally, wireless networks that use a regular 802.11 protocol (e.g., 802.11a, 802.11b, 802.11g, 802.11n, etc.) operate under a carrier sense multiple access (CSMA) mechanism for medium access. According to CSMA, devices sense the medium and only transmit when the medium is sensed to be idle. Thus, if the APs 204A-C and/or STAs 206A-H are operating according to the CSMA mechanism and a device in the BSA 202C (e.g., the AP 204C) is transmitting data, then the APs 204A-B and/or STAs 206A-F outside of the BSA 202C may not transmit over the medium even though they are part of a different BSA.

FIG. 2A illustrates such a situation. As illustrated in FIG. 2A, AP 204C is transmitting over the medium. The transmission is sensed by STA 206G, which is in the same BSA 202C as the AP 204C, and by STA 206A, which is in a different BSA than the AP 204C. While the transmission may be addressed to the STA 206G and/or only STAs in the BSA 202C, STA 206A nonetheless may not be able to transmit or receive communications (e.g., to or from the AP 204A) until the AP 204C (and any other device) is no longer transmitting on the medium. Although not shown, the same may apply to STAs 206D-F in the BSA 202B and/or STAs 206B-C in the BSA 202A as well (e.g., if the transmission by the AP 204C is stronger such that the other STAs can sense the transmission on the medium).

The use of the CSMA mechanism then creates inefficiencies because some APs or STAs outside of a BSA may be able to transmit data without interfering with a transmission made by an AP or STA in the BSA. As the number of active wireless devices continues to grow, the inefficiencies may begin to significantly affect network latency and throughput. For example, significant network latency issues may appear in apartment buildings, in which each apartment unit may include an access point and associated stations. In fact, each apartment unit may include multiple access points, as a resident may own a wireless router, a video game console with wireless media center capabilities, a television with wireless media center capabilities, a cell phone that can act like a personal hot-spot, and/or the like. Correcting the inefficiencies of the CSMA mechanism may then be vital to avoid latency and throughput issues and overall user dissatisfaction.

Such latency and throughput issues may not even be confined to residential areas. For example, multiple access points may be located in airports, subway stations, and/or other densely-populated public spaces. Currently, WiFi access may be offered in these public spaces, but for a fee. If the inefficiencies created by the CSMA mechanism are not corrected, then operators of the wireless networks may lose customers as the fees and lower quality of service begin to outweigh any benefits.

Accordingly, the high-efficiency 802.11 protocol described herein may allow for devices to operate under a modified mechanism that minimizes these inefficiencies and increases network throughput. Such a mechanism is described below with respect to FIGS. 2B, 3, and 4. Additional aspects of the high-efficiency 802.11 protocol are described below with respect to FIGS. 5A-14.

Figure 2B:
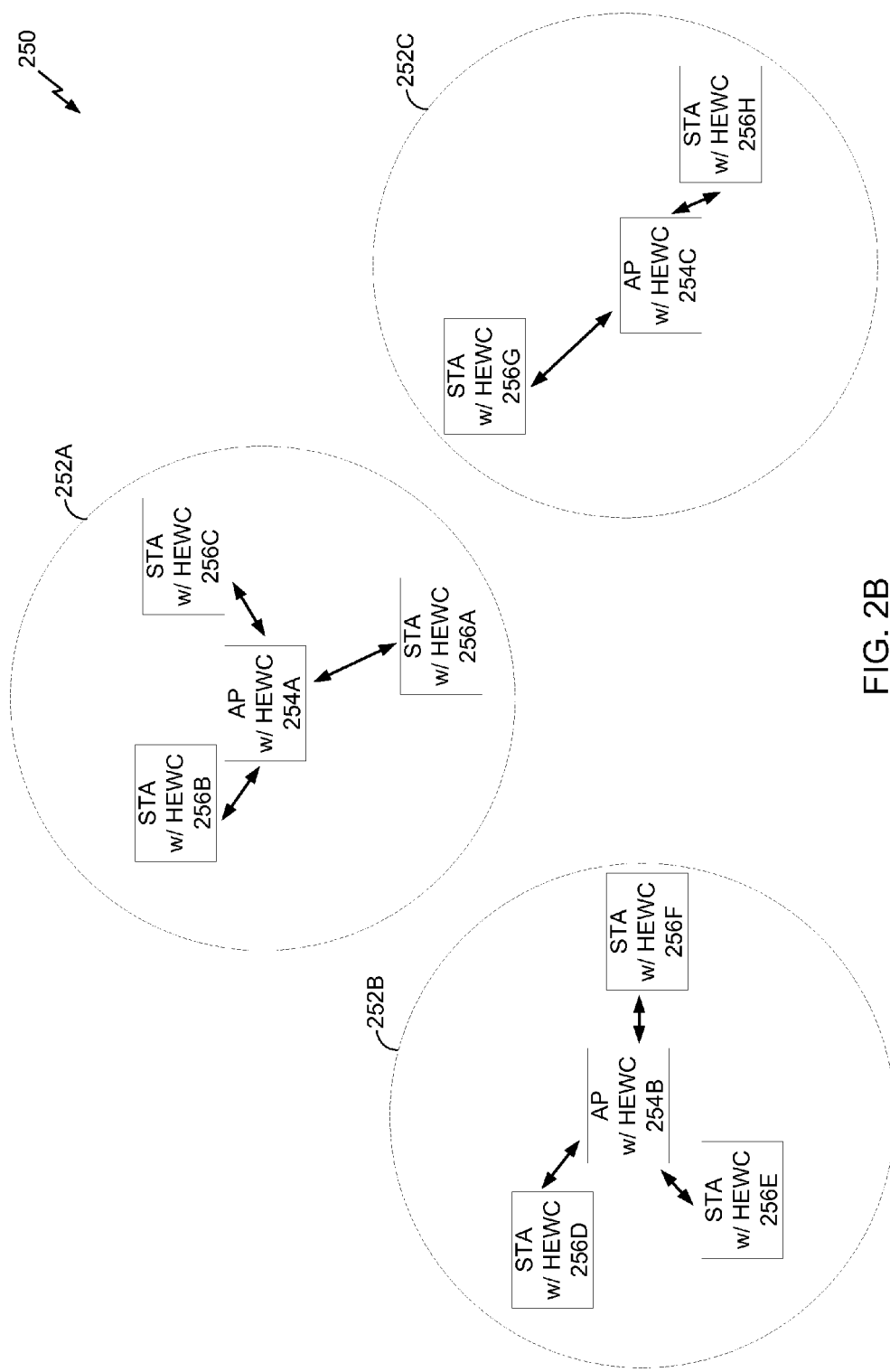
FIG. 2B shows another wireless communication system in which multiple wireless communication networks are present.

FIG. 2B shows a wireless communication system 250 in which multiple wireless communication networks are present. Unlike the wireless communication system 200 of FIG. 2A, the wireless communication system 250 may operate pursuant to the high-efficiency 802.11 standard discussed herein. The wireless communication system 250 may include an AP 254A, an AP 254B, and an AP 254C. The AP 254A may communicate with STAs 256A-C, the AP 254B may communicate with STAs 256D-F, and the AP 254C may communicate with STAs 256G-H.

A variety of processes and methods may be used for transmissions in the wireless communication system 250 between the APs 254A-C and the STAs 256A-H. For example, signals may be sent and received between the APs 254A-C and the STAs 256A-H in accordance with OFDM/OFDMA techniques or CDMA techniques.

The AP 254A may act as a base station and provide wireless communication coverage in a BSA 252A. The AP 254B may act as a base station and provide wireless communication coverage in a BSA 252B. The AP 254C may act as a base station and provide wireless communication coverage in a BSA 252C. It should be noted that each BSA 252A, 252B, and/or 252C may not have a central AP 254A, 254B, or 254C, but rather may allow for peer-to-peer communications between one or more of the STAs 256A-H. Accordingly, the functions of the AP 254A-C described herein may alternatively be performed by one or more of the STAs 256A-H.

In an embodiment, the APs 254A-C and/or STAs 256A-H include a high-efficiency wireless component. As described herein, the high-efficiency wireless component may enable communications between the APs and STAs using the high-efficiency 802.11 protocol. In particular, the high-efficiency wireless component may enable the APs 254A-C and/or STAs 256A-H to use a modified mechanism that minimizes the inefficiencies of the CSMA mechanism (e.g., enables concurrent communications over the medium in situations in which interference would not occur). The high-efficiency wireless component is described in greater detail below with respect to FIG. 4.

As illustrated in FIG. 2B, the BSAs 252A-C are physically located near each other. When, for example, AP 254A and STA 256B are communicating with each other, the communication may be sensed by other devices in BSAs 252B-C. However, the communication may only interfere with certain devices, such as STA 256F and/or STA 256G.

Under CSMA, AP 254B would not be allowed to communicate with STA 256E even though such communication would not interfere with the communication between AP 254A and STA 256B. Thus, the high-efficiency 802.11 protocol operates under a modified mechanism that differentiates between devices that can communicate concurrently and devices that cannot communicate concurrently. Such classification of devices may be performed by the high-efficiency wireless component in the APs 254A-C and/or the STAs 256A-H.

In an embodiment, the determination of whether a device can communicate concurrently with other devices is based on a location of the device. For example, a STA that is located near an edge of the BSA may be in a state or condition such that the STA cannot communicate concurrently with other devices. As illustrated in FIG. 2B, STAs 206A, 206F, and 206G may be devices that are in a state or condition in which they cannot communicate concurrently with other devices. Likewise, a STA that is located near the center of the BSA may be in a station or condition such that the STA can communicate with other devices. As illustrated in FIG. 2, STAs 206B, 206C, 206D, 206E, and 206H may be devices that are in a state or condition in which they can communicate concurrently with other devices. Note that the classification of devices is not permanent. Devices may transition between being in a state or condition such that they can communicate concurrently and being in a state or condition such that they cannot communicate concurrently (e.g., devices may change states or conditions when in motion, when associating with a new AP, when disassociating, etc.).

Furthermore, devices may be configured to behave differently based on whether they are ones that are or are not in a state or condition to communicate concurrently with other devices. For example, devices that are in a state or condition such that they can communicate concurrently may communicate within the same spectrum. However, devices that are in a state or condition such that they cannot communicate concurrently may employ certain techniques, such as spatial multiplexing or frequency domain multiplexing, in order to communicate over the medium. The controlling of the behavior of the devices may be performed by the high-efficiency wireless component in the APs 254A-C and/or the STAs 256A-H.

In an embodiment, devices that are in a state or condition such that they cannot communicate concurrently use spatial multiplexing techniques to communicate over the medium. For example, power and/or other information may be embedded within the preamble of a packet transmitted by another device. A device in a state or condition such that the device cannot communicate concurrently may analyze the preamble when the packet is sensed on the medium and decide whether or not to transmit based on a set of rules.

Figure 3:
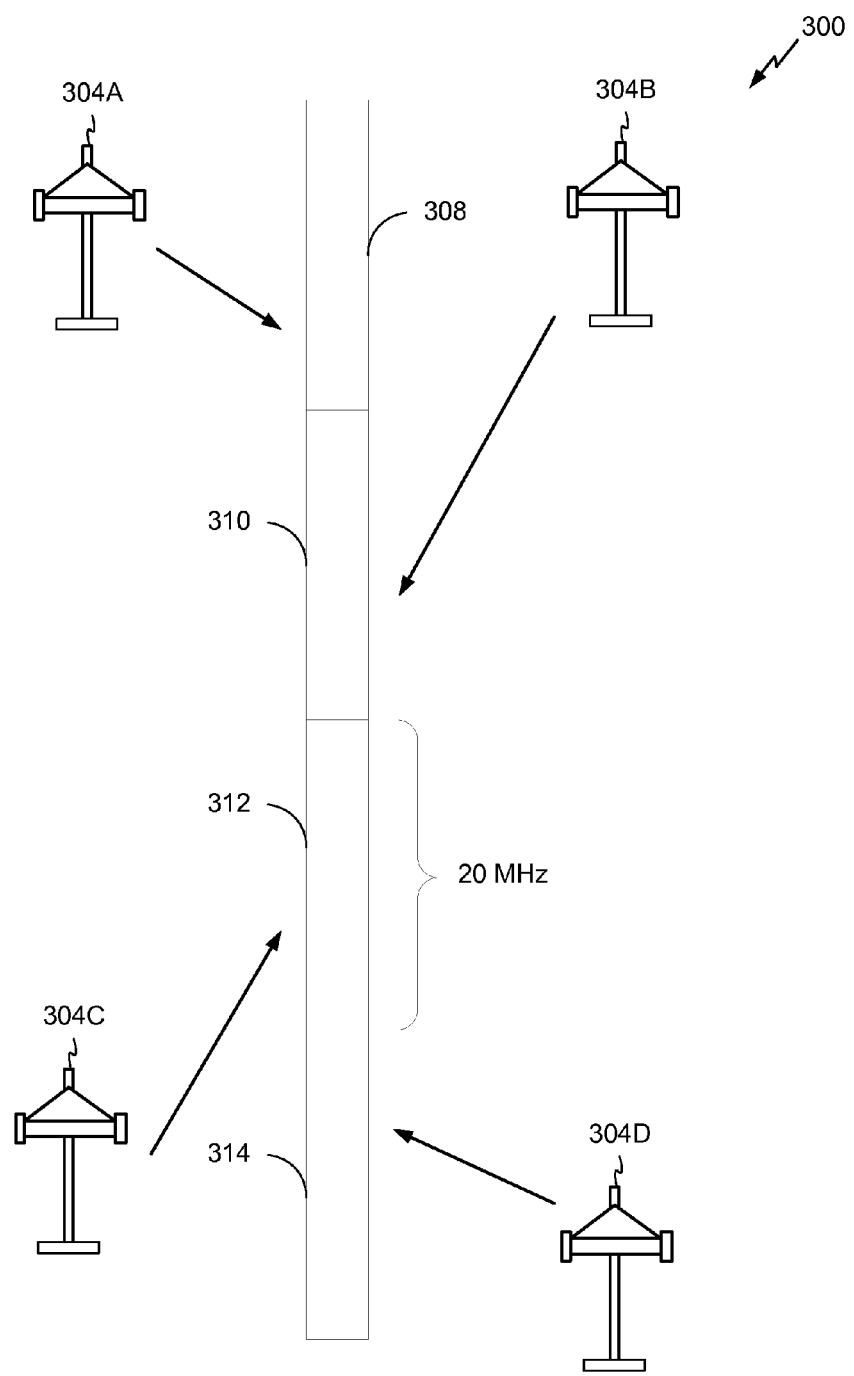
FIG. 3 shows frequency multiplexing techniques that may be employed within the wireless communication systems of FIGS. 1 and 2B.

In another embodiment, devices that are in a state or condition such that they cannot communicate concurrently use frequency domain multiplexing techniques to communicate over the medium. FIG. 3 shows frequency multiplexing techniques that may be employed within the wireless communication systems 100 of FIG. 1 and 250 of FIG. 2B. As illustrated in FIG. 3, an AP 304A, 304B, 304C, and 304D may be present within a wireless communication system 300. Each of the APs 304A, 304B, 304C, and 304D may be associated with a different BSA and include the high-efficiency wireless component described herein.

As an example, the bandwidth of the communication medium may be 80 MHz. Under the regular 802.11 protocol, each of the APs 304A, 304B, 304C, and 304D and the STAs associated with each respective AP attempt to communicate using the entire bandwidth, which can reduce throughput. However, under the high-efficiency 802.11 protocol using frequency domain multiplexing, the bandwidth may be divided into four 20 MHz segments 308, 310, 312, and 314 (e.g., channels), as illustrated in FIG. 3. The AP 304A may be associated with segment 308, the AP 304B may be associated with segment 310, the AP 304C may be associated with segment 312, and the AP 304D may be associated with segment 314.

In an embodiment, when the APs 304A-D and the STAs that are in a state or condition such that the STAs can communicate concurrently with other devices (e.g., STAs near the center of the BSA) are communicating with each other, then each AP 304A-D and each of these STAs may communicate using a portion of or the entire 80 MHz medium. However, when the APs 304A-D and the STAs that are in a state or condition such that the STAs cannot communicate concurrently with other devices (e.g., STAs near the edge of the BSA) are communicating with each other, then AP 304A and its STAs communicate using 20 MHz segment 308, AP 304B and its STAs communicate using 20 MHz segment 310, AP 304C and its STAs communicate using 20 MHz segment 312, and AP 304D and its STAs communicate using 20 MHz segment 314. Because the segments 308, 310, 312, and 314 are different portions of the communication medium, a first transmission using a first segment would not interference with a second transmission using a second segment.

Thus, APs and/or STAs, even those that are in a state or condition such that they cannot communicate concurrently with other devices, that include the high-efficiency wireless component can communicate concurrently with other APs and STAs without interference. Accordingly, the throughput of the wireless communication system 300 may be increased. In the case of apartment buildings or densely-populated public spaces, APs and/or STAs that use the high-efficiency wireless component may experience reduced latency and increased network throughput even as the number of active wireless devices increases, thereby improving user experience.

Figure 4:
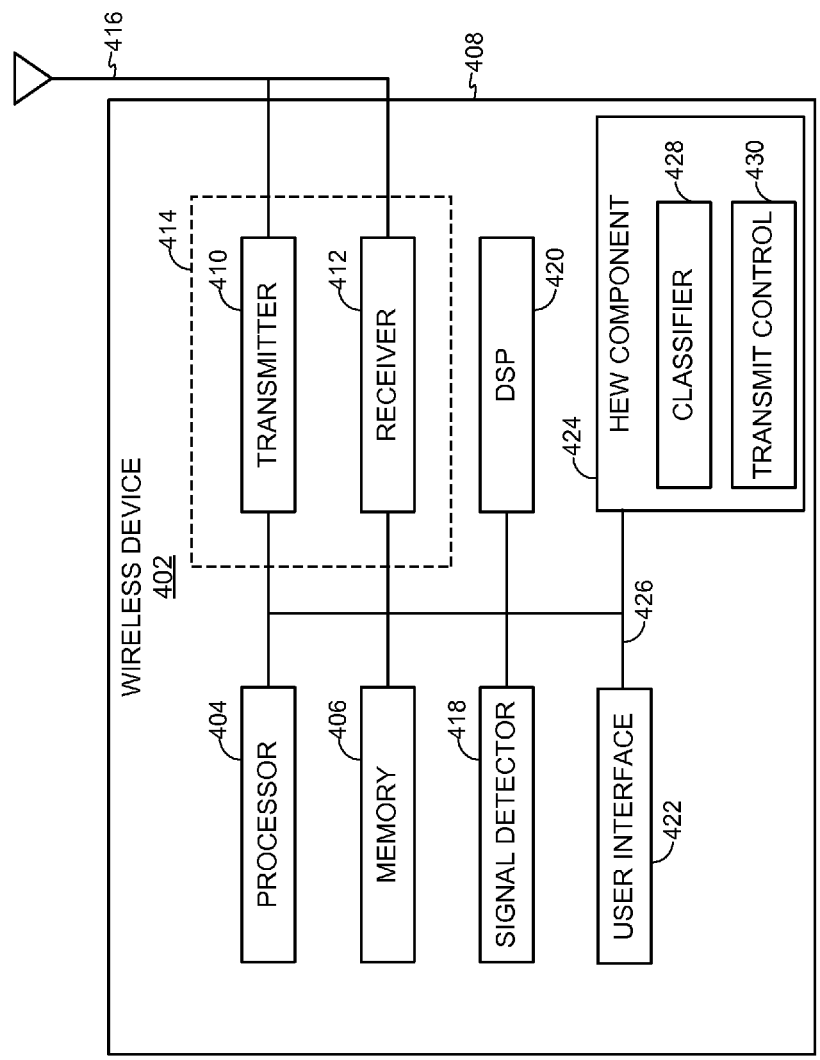
FIG. 4 shows a functional block diagram of an exemplary wireless device that may be employed within the wireless communication systems of FIGS. 1, 2B, and 3.

FIG. 4 shows an exemplary functional block diagram of a wireless device 402 that may be employed within the wireless communication systems 100, 250, and/or 300 of FIGS. 1, 2B, and 3. The wireless device 402 is an example of a device that may be configured to implement the various methods described herein. For example, the wireless device 402 may comprise the AP 104, one of the STAs 106, one of the APs 254, one of the STAs 256, and/or one of the APs 304.

The wireless device 402 may include a processor 404 which controls operation of the wireless device 402. The processor 404 may also be referred to as a central processing unit (CPU). Memory 406, which may include both read-only memory (ROM) and random access memory (RAM), may provide instructions and data to the processor 404. A portion of the memory 406 may also include non-volatile random access memory (NVRAM). The processor 404 typically performs logical and arithmetic operations based on program instructions stored within the memory 406. The instructions in the memory 406 may be executable to implement the methods described herein.

The processor 404 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 402 may also include a housing 408 that may include a transmitter 410 and/or a receiver 412 to allow transmission and reception of data between the wireless device 402 and a remote location. The transmitter 410 and receiver 412 may be combined into a transceiver 414. An antenna 416 may be attached to the housing 408 and electrically coupled to the transceiver 414. The wireless device 402 may also include (not shown) multiple transmitters, multiple receivers, multiple transceivers, and/or multiple antennas.

The wireless device 402 may also include a signal detector 418 that may be used in an effort to detect and quantify the level of signals received by the transceiver 414. The signal detector 418 may detect such signals as total energy, energy per subcarrier per symbol, power spectral density and other signals. The wireless device 402 may also include a digital signal processor (DSP) 420 for use in processing signals. The DSP 420 may be configured to generate a packet for transmission. In some aspects, the packet may comprise a physical layer data unit (PPDU).

The wireless device 402 may further comprise a user interface 422 in some aspects. The user interface 422 may comprise a keypad, a microphone, a speaker, and/or a display. The user interface 422 may include any element or component that conveys information to a user of the wireless device 402 and/or receives input from the user.

The wireless devices 402 may further comprise a high-efficiency wireless component 424 in some aspects. The high-efficiency wireless component 424 may include a classifier unit 428 and a transmit control unit 430. As described herein, the high-efficiency wireless component 424 may enable APs and/or STAs to use a modified mechanism that minimizes the inefficiencies of the CSMA mechanism (e.g., enables concurrent communications over the medium in situations in which interference would not occur).

The modified mechanism may be implemented by the classifier unit 428 and the transmit control unit 430. In an embodiment, the classifier unit 428 determines which devices are in a state or condition such that they can communicate concurrently with other devices and which devices are in a state or condition such that they cannot communicate concurrently with other devices. In an embodiment, the transmit control unit 430 controls the behavior of devices. For example, the transmit control unit 430 may allow certain devices to transmit concurrently on the same medium and allow other devices to transmit using a spatial multiplexing or frequency domain multiplexing technique. The transmit control unit 430 may control the behavior of devices based on the determinations made by the classifier unit 428.

The various components of the wireless device 402 may be coupled together by a bus system 426. The bus system 426 may include a data bus, for example, as well as a power bus, a control signal bus, and a status signal bus in addition to the data bus. Those of skill in the art will appreciate the components of the wireless device 402 may be coupled together or accept or provide inputs to each other using some other mechanism.

Although a number of separate components are illustrated in FIG. 4, those of skill in the art will recognize that one or more of the components may be combined or commonly implemented. For example, the processor 404 may be used to implement not only the functionality described above with respect to the processor 404, but also to implement the functionality described above with respect to the signal detector 418 and/or the DSP 420. Further, each of the components illustrated in FIG. 4 may be implemented using a plurality of separate elements.

The wireless device 402 may comprise an AP 104, a STA 106, an AP 254, a STA 256, and/or an AP 304, and may be used to transmit and/or receive communications. That is, either AP 104, STA 106, AP 254, STA 256, or AP 304 may serve as transmitter or receiver devices. Certain aspects contemplate signal detector 418 being used by software running on memory 406 and processor 404 to detect the presence of a transmitter or receiver.

Currently, the majority of communications made in a BSS are between an AP and a STA. However, peer-to-peer applications, where a STA communicates directly with another STA in the BSS, are expected to become more ubiquitous in the coming years. For example, cell phones increasingly have the ability to communicate directly with other cell phones (e.g., to share photos, music, video, etc.). By communicating directly with each other, STAs can avoid potential latency issues associated with communications that must first pass through an AP.

There are two main protocols that can be used for peer-to-peer communications. The first, tunneled direct link setup (TDLS), which is defined by IEEE, allows for peer-to-peer communications between STAs that are associated with the same AP. The second, WiFi Direct, which is a Wi-Fi Alliance protocol, allows a STA to behave similarly to an AP and connect to other STAs.

However, neither protocol has the capability of coordinating an explicit coexistence between peer-to-peer transmissions (e.g., transmissions between STAs in a BSS) and co-located AP BSS transmissions (e.g., transmissions between an AP and a STA in the BSS, referred to as AP traffic communications or transmissions). The lack of a protocol that explicitly defines such coordination may be problematic. For example, STAs engaging in peer-to-peer communications may interfere with AP-to-STA communications, and vice-versa. Furthermore, the network may suffer from increased latency and reduced throughput because STAs may be waiting for an AP to finish communicating with another STA or because an AP may be waiting for STAs to finish communicating.

Accordingly, an explicit coordination mechanism is described herein for use with the high-efficiency 802.11 protocol. The coordination mechanism may be based on a multiplexing of medium access in frequency or on a multiplexing of medium access in time.

Frequency Domain Multiplexing

In an embodiment, a coordination mechanism based on a multiplexing of medium access in frequency (e.g., referred to as frequency domain multiplexing) allows for concurrent peer-to-peer and AP traffic communications. For example, a communication medium may have a certain bandwidth (e.g., 80 MHz). Normally, a portion or the entire bandwidth is used by the AP during communications to and from the STAs. However, as described herein, a portion of the bandwidth of the communication medium (e.g., 20 MHz) may be reserved for AP traffic communications, whereas another portion of the bandwidth of the communication medium (e.g., 20 MHz) may be reserved for peer-to-peer communications. In other words, the communication medium may be divided into segments or channels, and one or more of the segments or channels may be reserved for AP traffic communications or peer-to-peer communications.

The segments or channels could each have the same bandwidth or could be of different bandwidths. For example, one channel or segment could have a bandwidth of 20 MHz and another could have a bandwidth of 40 MHz. Furthermore, the channels or segments may or may not be contiguous. For example, two channels or segments may be contiguous if they cover consecutive frequency ranges. If two channels or segments each have a bandwidth of 20 MHz, the two channels or segments may be contiguous if they cover a 40 MHz range, such as from 1000 MHz to 1040 MHz.

Figure 5A:
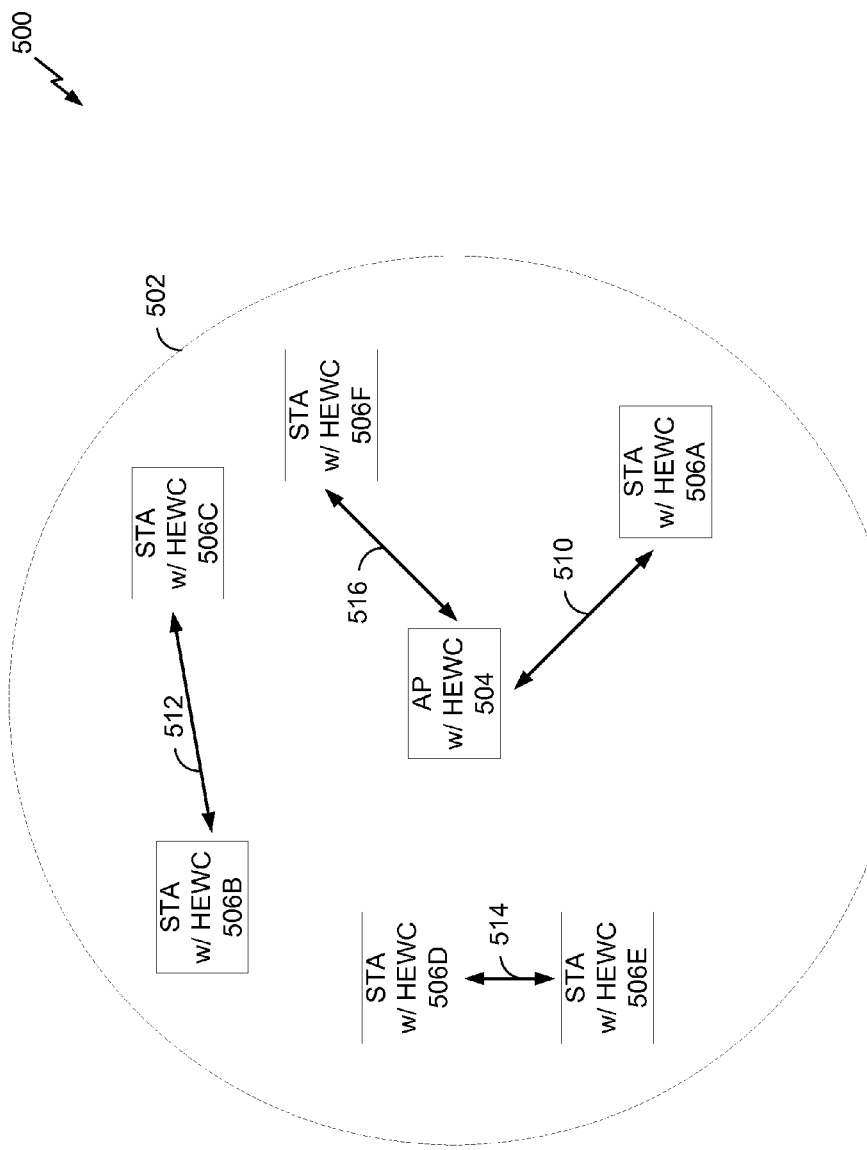
FIG. 5A shows a wireless communication system in which aspects of the present disclosure may be employed.

FIG. 5A shows a wireless communication system 500 in which aspects of the present disclosure may be employed. As illustrated in FIG. 5A, the wireless communication system 500 includes a BSA 502. The BSA 502 includes an AP 504 and STAs 506A-F. In an embodiment, the AP 504 and the STAs 506A-F each include a high-efficiency wireless component described herein. In other embodiments, either the AP 504 or the STAs 506A-F include the high-efficiency wireless component described herein.

The AP 504 and the STA 506A may communicate with each other via communication 510. Communication 510 may be an AP traffic communication. The AP 504 and the STA 506F may communicate via communication 516. Communication 516 may also be an AP traffic communication. The STA 506B and the STA 506C may communicate with each other via communication 512. Communication 512 may be a peer-to-peer communication. The STA 506D and the STA 506E may communicate with each other via communication 514. Communication 514 may also be a peer-to-peer communication. Although not shown, the AP 504 and the STAs 506B-C and 506D-E may have the ability to communicate with each other as well. Likewise, although not shown, STA 506A and 506F may have the ability to communicate with each other.

In an embodiment, the AP 504 transmits a message to one or more of the STAs 506A-F indicating a portion of the communication medium that is available for peer-to-peer communications. Because the portion of the communication medium that is available for peer-to-peer communications may be separate from the portion of the communication medium that is available for AP 504 traffic communications, the peer-to-peer communications may be concurrent with DL transmissions from the AP 504 to a STA 506A-F and/or UL transmissions from a STA 506A-F to the AP 504. In some embodiments, the AP 504 uses downlink frequency-division multiple access (DL-FDMA)/multiuser multiple input multiple output (MU-MIMO), which would allow the peer-to-peer communications to be concurrent with DL transmissions from the AP 504 to two or more STAs 506A-F and/or uplink frequency-divisional multiple access (UL-FDMA)/MU-MIMO, which would allow the peer-to-peer communications to be concurrent with UL transmissions from two or more STAs 506A-F to the AP 504.

In another embodiment, the AP 504 transmit a message to one or more of the STAs 506A-F and one or more other APs, not shown, indicating a portion of the communication medium that is available for communications between the AP 504 and the STAs 506A-F and between other APs and other STAs, not shown. Because the portion of the communication medium that is available for communications between the AP 504 and the STAs 506A-F may be separate from the portion of the communication medium that is available for communications between the other APs and other STAs, not shown, the communications between the AP 504 and the STAs 506A-F may be concurrent with the communications between other APs and other STAs, not shown.

Figure 5B:
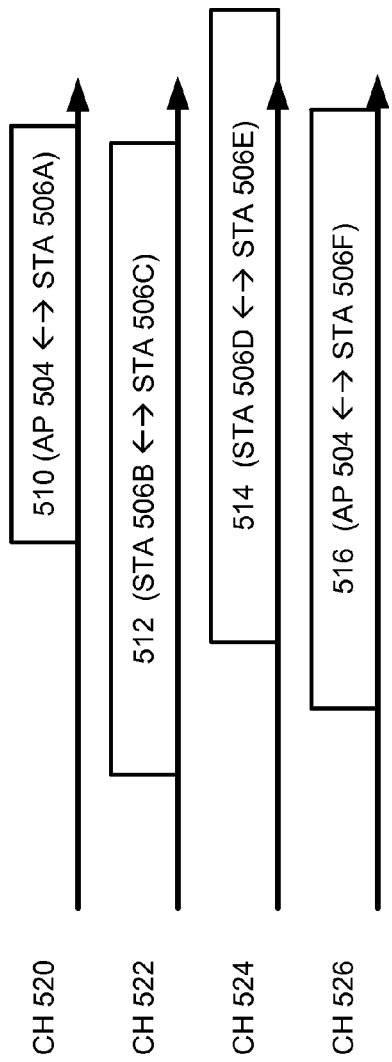
FIG. 5B shows a timing diagram in which aspects of the present disclosure may be employed.

FIG. 5B shows a timing diagram in which aspects of the present disclosure may be employed. As illustrated in FIG. 5B, the communication medium is divided into four channels: channel 520, channel 522, channel 524, and channel 526. In an embodiment, channels 520, 522, 524, and 526 are contiguous (e.g., each channel 520, 522, 524, and 526 covers consecutive 20 MHz frequency ranges, such as from 1000 MHz to 1080 MHz). In other embodiments, channels 520, 522, 524, and 526 are not contiguous. While FIG. 5B (and FIGS. 5B, 6A, and 6B described below) illustrates four channels, this is merely exemplary as the techniques disclosed herein may apply for any number of channels.

In an embodiment, the AP 504 transmits a message indicating that channel 520 and channel 526 are reserved for AP 504 traffic communications and that channel 522 and 524 are reserved for peer-to-peer communications. In a further embodiment, the message indicates that the channel 520 is reserved for communication 510 (e.g., communications between the AP 504 and the STA 506A), that the channel 522 is reserved for communication 512 (e.g., communications between the STA 506B and the STA 506C), that the channel 524 is reserved for communication 514 (e.g., communications between the STA 506D and the STA 506E), and that the channel 526 is reserved for communication 516 (e.g., communications between the AP 504 and the STA 506F).

The allocation of STAs 506A-F and channels 520, 522, 524, and 526 may further be provided to other APs in other BSAs. For example, the BSA 502 may be located near other BSAs, such as in FIGS. 2A-B. Coordinating with other BSAs may allow the AP 504 and/or the STAs 506A-F to make communications at the same time as other APs or STAs in other BSAs (e.g., the other APs or STAs may use a different channel based on the allocation provided by AP 504). In this way, network throughput can be increased even when the AP 504 or STAs 506A-F are located within a dense area of wireless networks.

In some embodiments, the communications 510, 512, 514, and/or 516 may be transmitted at different times. In other embodiments, not shown, the communications 510, 512, 514, and/or 516 may be transmitted concurrently (e.g., at the same time).

In an embodiment, the coordination of peer-to-peer communications and AP traffic communications is enforced via an exchange of messages between the AP 504 and the STAs 506A-F. The messages may be initiated by the AP 504 or any of the STAs 506A-F, and the allocation of the bandwidth in the communication medium may be static or dynamic.

As described above, the AP 504 may transmit a coordination message to one or more STAs 506A-F or one or more groups of STAs 506A-F indicating available bandwidth for peer-to-peer communications. In some aspects, the coordination message may be transmitted to only the STAs 506A-F or only the one or more groups of STAs 506A-F that have indicated a desire to engage in peer-to-peer communications. The AP 504 may statically assign channels 520, 522, 524, and/or 526 to be used for peer-to-peer communications or AP 504 traffic communications, and such allocation or assignments may be provided in the coordination message and/or additional management signals. Such allocation or assignments may be valid for a certain interval of time. Such allocation or assignments may also be based on an earlier request from a peer-to-peer STA 506A-F (e.g., an earlier request from a STA 506A-F indicating a desire to engage in peer-to-peer communications). The coordination message and/or additional management signals may be an information element (IE), a management frame sent to the STAs 506A-F that have indicated a desire to engage in peer-to-peer communications, or included in a beacon message. The coordination message and/or additional management signals may inform both STAs 506A-F that have indicated a desire to engage in peer-to-peer communications and STAs 506A-F that have not indicated a desire to engage in peer-to-peer communications (e.g., those that will engage in AP traffic communications) of the channel allocation.

Alternatively, the AP 504 may explicitly or implicitly dynamically assign channels 520, 522, 524, and/or 526 to be used for peer-to-peer communications or AP 504 traffic communications. For example, the AP 504 may explicitly dynamically assign the channels by determining the assignment prior to a data transmission from the AP 504 to any of the STAs 506A-F and when the number of used channels is known. As another example, the AP 504 may explicitly dynamically assign the channels by determining the assignment prior to a scheduled data transmission from one of the STAs 506A-F and when the number of used channels is known. The allocation or assignments (and specifically which channels are available for peer-to-peer communications) may be provided in the coordination message. Additionally, the coordination message may include the duration of time that a channel will be available for peer-to-peer communications and/or AP 504 traffic communications.

The AP 504 may implicitly dynamically assign the channels based on the occurrence of an AP 504 traffic communication on a particular channel. For example, if channel 520 includes an occurrence of an AP 504 traffic communication and the other channels 522, 524, and 526 are idle, the AP 504 may implicitly grant access to channels 522, 524, and/or 526 to those STAs that desire to engage in peer-to-peer communications. In an embodiment, the AP 504 implicitly grants access to secondary channels (e.g., 520, 522, 524) for peer-to-peer communications when a primary channel (e.g., 526), which is the default channel used for communications, is busy with an AP 504 traffic communication. In this case, the use of the implicit dynamic assignment (e.g., the implicit granting of access to the secondary channels) may be indicated by the AP 504 with one or more bits in a management message transmitted to the STAs 506A-F and/or indicated by the AP 504 via inclusion in a beacon message. The management message may grant to the STAs that desire to engage in peer-to-peer communications the use of the available bandwidth concurrently with transmissions to and from the AP 504 (e.g., the AP 504 traffic communications). In order to facilitate the implicit use of unused bandwidth, the AP 504 may precede its transmissions with a frame that may be decodable by all STAs in the BSS that desire to engage in peer-to-peer communications (e.g., a clear to send (CTS) message or a request to send (RTS) message) such that those STAs are informed of the start of an implicit channel allocation and of a duration of the implicit channel allocation. In a further embodiment, when the channel allocation is implicitly dynamically assigned, the STAs that desire to engage in peer-to-peer communications access the available bandwidth using CSMA.

As described above, a STA 506A-F may initiate a coordination message, requesting available bandwidth (e.g., an available channel) from the AP 504 for peer-to-peer communications. Based on the request from the STA 506A-F, the AP 504 may statically assign channels 520, 522, 524, and/or 526 to be used for peer-to-peer communications or AP 504 traffic communications, and such allocation or assignments may be provided in the coordination message and/or additional management signals. Such allocation or assignments may be valid for a certain interval of time. Such allocation or assignments may also be based on an earlier request from a peer-to-peer STA 506A-F (e.g., an earlier request from a STA 506A-F indicating a desire to engage in peer-to-peer communications). Such allocation or assignments may be fixed, meaning no more requests from the STAs 506A-F may be necessary in order to obtain access to a channel for peer-to-peer communications.

Alternatively, based on the request from the STA 506A-F, the AP 504 may dynamically assign channels 520, 522, 524, and/or 526 to be used for peer-to-peer communications or AP 504 traffic communications. For example, the STA 506A-F may request access to a channel for peer-to-peer communications, and the AP 504 may grant and/or deny this request. After peer-to-peer transmissions are complete, a STA 506A-F may again request access to a channel for peer-to-peer communications if the STA 506A-F desires to engage in such communications at a later time.

Figure 5C:
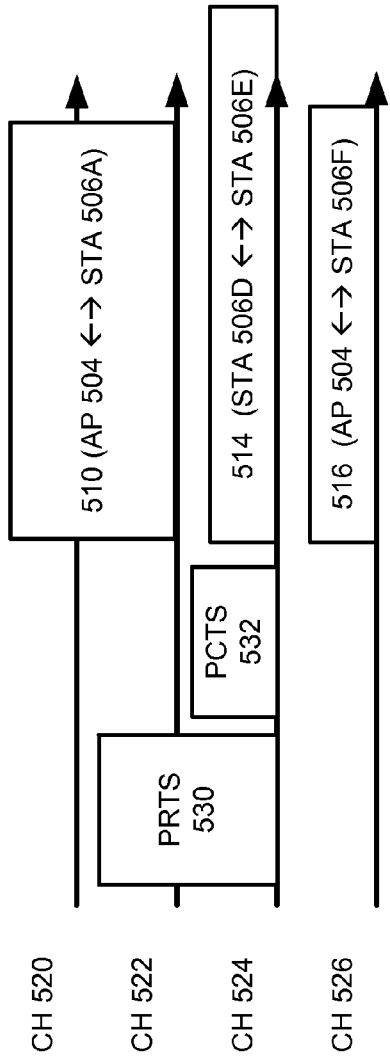
FIG. 5C shows another timing diagram in which aspects of the present disclosure may be employed.

FIG. 5C shows another timing diagram in which aspects of the present disclosure may be employed. In particular, FIG. 5C illustrates communications between the AP 504 and the STAs 506A-F when a STA 506A-F initiates the coordination message and when the AP 504 dynamically assigns the channels. As illustrated in FIG. 5C, one of the STAs 506A-F transmits a peer request to send (PRTS) message 530 to the AP 504. The AP 504 may inform the STAs 506A-F that desire to engage in peer-to-peer communications that peer-to-peer transmissions are to be granted by the AP 504. An indication of the grant by the AP 504 may be communicated to the STAs 506A-F in a management frame (e.g., a probe response, an association response, a beacon message, etc.). As an example, a STA, such as a STA 506A-F, that desires to engage in peer-to-peer communications and that operates in a BSS where the AP grants or denies peer-to-peer transmissions may follow the behavior described herein. The PRTS message 530 may be transmitted over the requested channels (e.g., channels 522 and 524) or over a primary channel (e.g., channel 526). The PRTS message 530 may indicate a desire to use certain channels. For example, as illustrated in FIG. 5C, the PRTS message 530 may indicate a desire by the STA 506A-F to engage in peer-to-peer communications using channels 522 and 524. The STA 506A-F may choose the requested channel(s) based on a sensed activity on the channel(s) (e.g., the STA 506A-F may choose a channel(s) that is idle).

The PRTS message 530 may be similar to or the same as an RTS message defined in the IEEE 802.11 protocol. An indication that the STA 506A-F is requesting a peer-to-peer transmission opportunity may be indicated in several ways. For example, the request may be implicitly indicated by the address of the sender, which may have previously indicated to the AP 504 the desire for a peer-to-peer operation. As another example, the request may be explicitly indicated by the use of a different transmission media access control (TX MAC) address that may be associated with peer-to-peer communications in general or that may be associated specifically with the STA 506A-F that transmitted the PRTS message 530 for peer-to-peer communications. As another example, the request may be explicitly indicated by the use of an HTC control field added to a legacy RTS. Some of the available bits may be reused for indicating the peer-to-peer communication request. As another example, the request may be explicitly indicated by the definition of a new frame format. As another example, the request may not be implicitly or explicitly indicated. Instead, the AP 504 may simply grant a CTS and the STA 506A-F that desires to engage in peer-to-peer communications is allowed to transmit to other STAs 506A-F instead of just the AP 504.

In an embodiment, the AP 504 responds with a peer clear to send (PCTS) message (e.g., a coordination message) 532. The PCTS message 532 indicates whether the request made by the STA 504A-F is granted and/or denied. The PCTS message 532 may also indicate the amount of time granted for peer-to-peer transmissions, which may be the same or different than the time indicated in the PRTS message 530. The PCTS message 532 may also indicate the bandwidth allowed for the peer-to-peer transmissions. For example, as illustrated in FIG. 5C, the PCTS message 532 grants the STA 504A-F request to communicate over channel 524, but rejects the STA 504A-F request to communicate over channel 522. The PCTS message 532 may be transmitted to the STA 506A-F that transmitted the PRTS message 530 or to some or all of the STAs 506A-F. The PCTS message 532 may be transmitted over the channel for which the request has been granted (e.g., channel 524) or the primary channel (e.g., channel 526). The PCTS message 532 may have the same or nearly same format as a CTS (e.g., the PCTS message 532 may or may not include additional information).

The PCTS message 532 may grant access to (or deny access to) a channel only to the STA 506A-F that made the request (e.g., transmitted the PRTS message 530). Alternatively, the PCTS message 532 may grant access to (or deny access to) a channel to any STAs 506A-F that engages in peer-to-peer communications. In this case, the STAs 506A-F may then contend using contention techniques, such as CSMA. As another alternative, the PCTS message 532 may grant access to (or deny access to) a channel to any STA 506A-F. In this case, the STAs 506A-F may then contend using contention techniques, such as CSMA.

Once the PCTS message 532 is received and at least one request is granted, the STA 506A-F that requested the channel(s) (and/or other STAs 506A-F) may begin the peer-to-peer communications. For example, STA 506D may have transmitted the PRTS message 530. After receiving the PCTS message 532, the STA 506D may communicate with STA 506E over communication 514.

For those channels which are not allocated for peer-to-peer transmissions (e.g., channels 520, 522, and 526), the AP 504 may use those channels for AP 504 traffic communications (e.g., UL and/or DL communications with STAs 506A-F). The AP 504 traffic communications may begin a time after the PCTS message 532 is transmitted. Note that an AP 504 traffic communication and/or a peer-to-peer communication may use channels of different bandwidths. For example, communication 510 uses twice the bandwidth (e.g., channels 520 and 522) as communication 514 (e.g., which only uses one channel 524).

In an embodiment, the PRTS message 530 and/or the PCTS message 532 provide protection for peer-to-peer and/or AP 504 traffic communications via a network allocation vector (NAV).

In other embodiments, the peer-to-peer STAs 506A-F may request access to a channel, such as the channel 524, via a regular access procedure (e.g., RTS/CTS messages). The AP 504 may use the bandwidth not assigned to the peer-to-peer STAs 506A-F.

Time Multiplexing

In an embodiment, a coordination mechanism based on a multiplexing of medium access in time (e.g., referred to as time multiplexing) allows for coordinated peer-to-peer and AP traffic communications or coordinated AP traffic communications among a plurality of APs. For example, the AP 504 may reserve an interval of time for peer-to-peer communications. FIG. 6A shows another timing diagram in which aspects of the present disclosure may be employed. In particular, FIG. 6A shows intervals of time reserved for AP 504 traffic communications and intervals of time reserved for peer-to-peer communications. For example, channel 526 may include both AP 504 traffic communications and peer-to-peer communications. Time period 602 may be reserved for AP 504 traffic communications. Time period 604 may be reserved for peer-to-peer communications. Time period 606 may be reserved for peer-to-peer communications. As another example, the AP 504 may reserve an interval of time for AP traffic communications (e.g., communications with other STAs, not shown) made by APs other than the AP 504, not shown.

In an embodiment, the coordination of peer-to-peer communications and AP traffic communications is enforced via an exchange of messages between the AP 504 and the STAs 506A-F. The messages may be initiated by the AP 504 or any of the STAs 506A-F, and the allocation of the bandwidth and time in the communication medium may be static or dynamic.

In another embodiment, the coordination of AP traffic communications among a plurality of APs is enforced via an exchange of messages between the AP 504 and other APs, not shown. The messages may be initiated by the AP 504 or any of the other APs, not shown, and the allocation of the bandwidth and time in the communication medium may be static or dynamic.

If the allocation is static, a restricted access window (RAW), such as the RAW defined in IEEE 802.11 ah, may be used. The RAW may restrict access to peer-to-peer communications (or traffic communications by other APs, not shown) to only a specific interval of time, as illustrated in FIG. 6A. The RAW may further restrict access to a specified group of STAs. For example, a first group of STAs 506A-F may be those associated with the AP 504 and that intend to communicate with the AP 504. A second group of STAs 506A-F may be those associated with the AP 504 and that intend to communicate with other STAs (e.g., STAs 506A-F) in the same BSS rather than the AP 504. A third group of STAs 506A-F may be those that are not associated with the AP 504, but intend to communicate with the AP 504. A fourth group of STAs 506A-F may be those that are not associated with the AP 504 and intend to communicate with another AP. A fifth group of STAs 506A-F may be those that are not associated with the AP 504 and that intend to communicate with other STAs (e.g., STAs 506A-F) rather than the AP 504. A sixth group of STAs 506A-F may be any combination of STAs in the first through fifth groups. The interval of time may be restricted to those STAs in any one or more of the groups.

STAs 506A-F may transmit a request to the AP 504 to be classified in any one or more of the groups. If a network includes a plurality of APs 504, the scheduling of the groups can be coordinated across the APs 504. For example, the APs 504 could coordinate such that all of the APs 504 allow for peer-to-peer communications at a same time. As another example, some or all of the APs 504 could coordinate such that some or all of the APs 504 allow for peer-to-peer communications at different times.

The interval(s) of time may be transmitted to the STAs 506A-F via a coordination message and/or additional management signals. The coordination message and/or additional management signals may be an information element (IE), a management frame sent to the STAs 506A-F that have indicated a desire to engage in peer-to-peer communications, or included in a beacon message. The allocation of the interval of time for peer-to-peer communications can be changed at some or each time an IE, a management frame, and/or a beacon message is transmitted. STAs 506A-F may decode each IE, management frame, and/or beacon message that they receive (e.g., if a respective STA 506A-F is not associated with an AP) or may decode IEs, management frames, and/or beacon messages received from an AP that the respective STA 506A-F is associated with. The coordination message and/or additional management signals may inform both STAs 506A-F that have indicated a desire to engage in peer-to-peer communications and STAs 506A-F that have not indicated a desire to engage in peer-to-peer communications (e.g., those that will engage in AP traffic communications) of the channel allocation.

Alternatively, the allocation may be defined dynamically by the AP 504. In an embodiment, the AP 504 transmits a coordination message on the communication medium, granting a specific time (e.g., BSS-TXOP) that peer-to-peer communications by STAs 506A-F or one or more groups of STAs 506A-F (or traffic communications by other APs, not shown) can be made. For example, the AP 504 may grant time only for STAs 506A-F associated with the AP 504 to allow the STAs 506A-F to communicate with the AP 504. As another example, the AP 504 may grant time only for STAs 506A-F associated with any AP to allow the STAs 506A-F to communicate with the AP that the respective STA 506A-F is associated with. Granting time only for specific STAs 506A-F or groups of STAs 506A-F may prevent interference from peer-to-peer communications and/or communications from other BSSs (e.g., traffic communications by other APs, not shown, from other BSSs). As another example, the AP 504 may grant time only for STAs 506A-F associated with APs in the same network (e.g., based on SSID).

The coordination message may be generated based on a request for access received by one or more of the STAs 506A-F. The coordination message may also be generated based on information known to the AP 504 that a STA 506A-F desires to make peer-to-peer communications. The desire from STAs 506A-F to engage in peer-to-peer communications (or communications with APs) may be indicated to the AP 504 via the use of a management indication, via the use of a control frame, and/or via the use of a quality of service (QoS) control field in a data frame sent to the AP 504.

The coordination message can be a legacy compatible frame (e.g., a control or management frame) that includes a NAV indication. Some or all STAs 506A-F may be configured to set the NAV, except for the STAs 506A-F that are able to decode the payload and find that they belong to a group that time has been granted to (e.g., a TXOP group). The coordination message may have a format similar to the format of a CTS (e.g., a BCTS). For example, the coordination message may have format similar to a legacy CTS-to-self (e.g., a message with a destination address that is the same as the sender address), but with a BSSID address with a multicast bit set. STAs that are associated with the AP can recognize the BSSID and can also be informed, via the multicast bit, that the STAs do not need to set the NAV. As another example, the coordination message may have format similar to a legacy CTS-to-self, but with one of the reserved bits set to one in either the frame control field, the duration field, and/or the SERVICE field. As another example, the coordination message may have format similar to a legacy CTS-to-self, but with an HTC field where one or more bits in the HTC field are used for indicating whether STAs of the BSS and/or STAs that are not engaging in peer-to-peer communications need to defer. As another example, the coordination message could be a new control frame. The new control frame could follow a legacy format and include a duration for the NAV setting, a BSSID (e.g., in case the NAV can be ignored only from STAs of a specific BSS), and/or a group(s) that time has been granted for. Presence of the BSSID may indicate that only STAs of the BSS are allowed to contend. Alternatively, one or more bits (e.g., in the new control frame) can explicitly convey the condition that only STAs of the BSS are allowed to contend.

In another embodiment, the AP 504 transmits a coordination message on the communication medium, granting a specific time (e.g., P2P-TXOP) that peer-to-peer communications by STAs 506A-F or one or more groups of STAs 506A-F (or traffic communications by other APs, not shown) can be made. For example, the AP 504 may grant time for peer-to-peer communications only to STAs 506A-F of the BSS of the AP 504. As another example, the AP 504 may grant time for peer-to-peer communications only to STAs 506A-F of any BSS. As another example, the AP 504 may grant time for peer-to-peer communications only to STAs 506A-F or groups of STAs 506A-F that are identified (e.g., via the STA address or group address) in the coordination message. The coordination message may have a format similar to the format of a CTS (e.g., a PCTS).

In another embodiment, the AP 504 transmits a message on the communication medium, scheduling times that specific peer-to-peer STAs 506A-F are allowed to transmit. The message may include the time for each peer-to-peer STA and an identity of the STA or group of STAs (e.g., a STA address).

In another embodiment, the AP 504 includes in a beacon message an indication of peer-to-peer intolerance. The peer-to-peer intolerance may indicates to STAs that the STAs of a BSS are not allowed to access the communication medium for peer-to-peer communications unless explicitly allowed to by the AP 504 (e.g., via another communication message).

In another embodiment, the dynamic allocation may be indicated by the AP 504 with one or more bits in a management message transmitted to the STAs 506A-F and/or indicated by the AP 504 via inclusion in a beacon message. The management message may grant to the STAs that desire to engage in peer-to-peer communications the use of bandwidth during a set time. The AP 504 may precede its transmissions with a frame that may be decodable by all STAs in the BSS that desire to engage in peer-to-peer communications (e.g., a clear to send (CTS) message or a request to send (RTS) message) such that those STAs are informed of the start of an available peer-to-peer transmission period and of a duration of that period.

FIG. 6B shows another timing diagram in which aspects of the present disclosure may be employed. In particular, FIG. 6B illustrates communications between the AP 504 and the STAs 506A-F when a STA 506A-F initiates the coordination message and when the AP 504 dynamically assigns the channels. As illustrated in FIG. 6B, one of the STAs 506A-F transmits a peer request to send (PRTS) message 630 to the AP 504. The AP 504 may inform the STAs 506A-F that desire to engage in peer-to-peer communications that peer-to-peer transmissions are to be granted by the AP 504. An indication of the grant by the AP 504 may be communicated to the STAs 506A-F in a management frame (e.g., a probe response, an association response, a beacon message, etc.). As an example, a STA, such as a STA 506A-F, that desires to engage in peer-to-peer communications and that operates in a BSS where the AP grants or denies peer-to-peer transmissions may follow the behavior described herein. The PRTS message 630 may be transmitted over the requested channels (e.g., channels 524 and 526) or over a primary channel (e.g., channel 526). The PRTS message 630 may indicate a desire to use certain channels. For example, as illustrated in FIG. 6B, the PRTS message 630 may indicate a desire by the STA 506A-F to engage in peer-to-peer communications using channels 524 and 526. The STA 506A-F may choose the requested channel(s) based on a sensed activity on the channel(s) (e.g., the STA 506A-F may choose a channel(s) that is idle).

The PRTS message 630 may be similar to or the same as an RTS message defined in the IEEE 802.11 protocol. An indication that the STA 506A-F is requesting a peer-to-peer transmission opportunity may be indicated in several ways. For example, the request may be implicitly indicated by the address of the sender, which may have previously indicated to the AP 504 the desire for a peer-to-peer operation. As another example, the request may be explicitly indicated by the use of a different TX MAC address that may be associated with peer-to-peer communications in general or that may be associated specifically with the STA 506A-F that transmitted the PRTS message 630 for peer-to-peer communications. As another example, the request may be explicitly indicated by the use of an HTC control field added to a legacy RTS. Some of the available bits may be reused for indicating the peer-to-peer communication request. As another example, the request may be explicitly indicated by the definition of a new frame format. As another example, the request may not be implicitly or explicitly indicated. Instead, the AP 504 may simply grant a CTS and the STA 506A-F that desires to engage in peer-to-peer communications is allowed to transmit to other STAs 506A-F instead of just the AP 504.

In an embodiment, the AP 504 responds with a peer clear to send (PCTS) message (e.g., a coordination message) 632. The PCTS message 632 indicates whether the request made by the STA 504A-F is granted and/or denied. The PCTS message 632 may also indicate the amount of time granted for peer-to-peer transmissions, which may be the same or different than the time indicated in the PRTS message 630. The PCTS message 632 may also indicate the bandwidth allowed for the peer-to-peer transmissions. For example, as illustrated in FIG. 6B, the PCTS message 632 grants the STA 504A-F request to communicate over channels 524 and 526. The PCTS message 632 may be transmitted to the STA 506A-F that transmitted the PRTS message 630 or to some or all of the STAs 506A-F. The PCTS message 632 may be transmitted over the channel for which the request has been granted (e.g., channels 524 and 524) or the primary channel (e.g., channel 526). The PCTS message 632 may have the same or nearly same format as a CTS (e.g., the PCTS message 632 may or may not include additional information).

The PCTS message 632 may grant access to (or deny access to) a channel only to the STA 506A-F that made the request (e.g., transmitted the PRTS message 630). Alternatively, the PCTS message 632 may grant access to (or deny access to) a channel to any STAs 506A-F that engages in peer-to-peer communications. In this case, the STAs 506A-F may then contend using contention techniques, such as CSMA. As another alternative, the PCTS message 632 may grant access to (or deny access to) a channel to any STA 506A-F. In this case, the STAs 506A-F may then contend using contention techniques, such as CSMA.

Once the PCTS message 632 is received and at least one request is granted, the STA 506A-F that requested the channel(s) (and/or other STAs 506A-F) may begin the peer-to-peer communications. For example, STA 506D may have transmitted the PRTS message 630. After receiving the PCTS message 632, the STA 506D may communicate with STA 506E over communication 514.

Figure 6C:
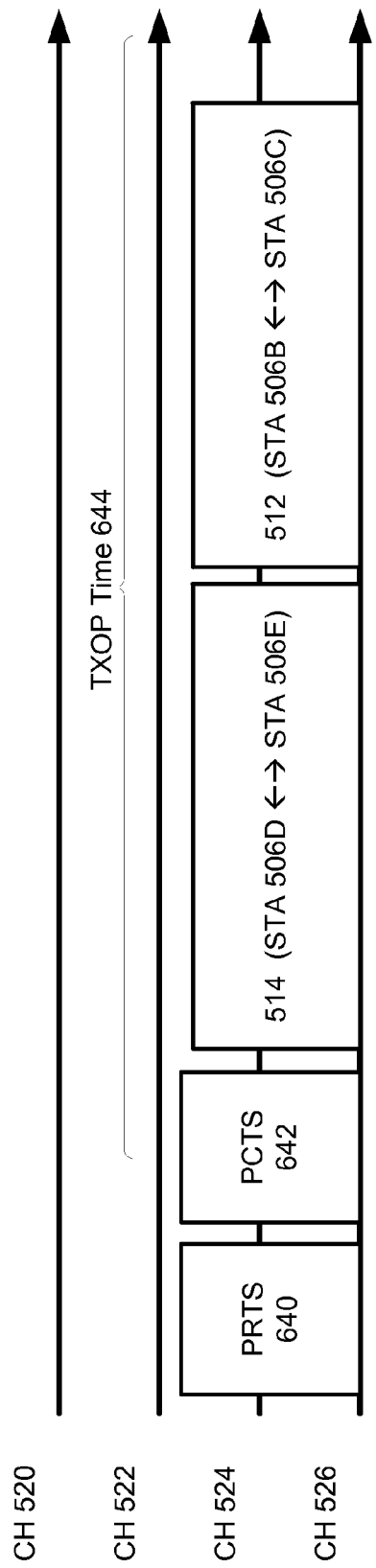
FIG. 6C shows another timing diagram in which aspects of the present disclosure may be employed.

FIG. 6C shows another timing diagram in which aspects of the present disclosure may be employed. In particular, FIG. 6C illustrates communications between the AP 504 and the STAs 506A-F when a STA 506A-F initiates the coordination message and when the AP 504 dynamically assigns the channels. As illustrated in FIG. 6C one of the STAs 506A-F transmits a PRTS message 640 to another STA 506A-F. The PRTS message 640 is transmitted to reserve an interval of time for peer-to-peer communications (e.g., a TXOP time 644). The STA 506A-F that the PRTS message 640 is intended for may reply with a frame (e.g., PCTS message 642) granting the TXOP time 644. During the TXOP time 644, any peer-to-peer STA 506A-F may contend for access to the communication medium. For example, STA 506D and STA 506E may communicate first via communication 514 (e.g., after determining the medium is idle for a set period of time, for a time based on a backoff count, etc.). Once the channel 524 and/or 526 is idle (e.g., for a set period of time, for a time based on a backoff count, etc.), STA 506B and STA 506C may communicate via communication 512. In this way, the peer-to-peer STAs 506A-F may be able to communicate via multi-hop links.

In an embodiment, the PRTS message 640 and/or the PCTS message 642 are legacy compatible frames, which allows legacy STAs to set the NAV. For example, the PRTS message 640 may have the same format as a legacy RTS message with additional signaling included in reserved bits in frame control and/or the SERVICE field indicating that the frame is for peer-to-peer communications. Likewise, the PCTS message 642 may have the same format as a legacy CTS message with additional signaling included in reserved bits in frame control and/or the SERVICE field indicating that the frame is for peer-to-peer communications.

Figure 7:
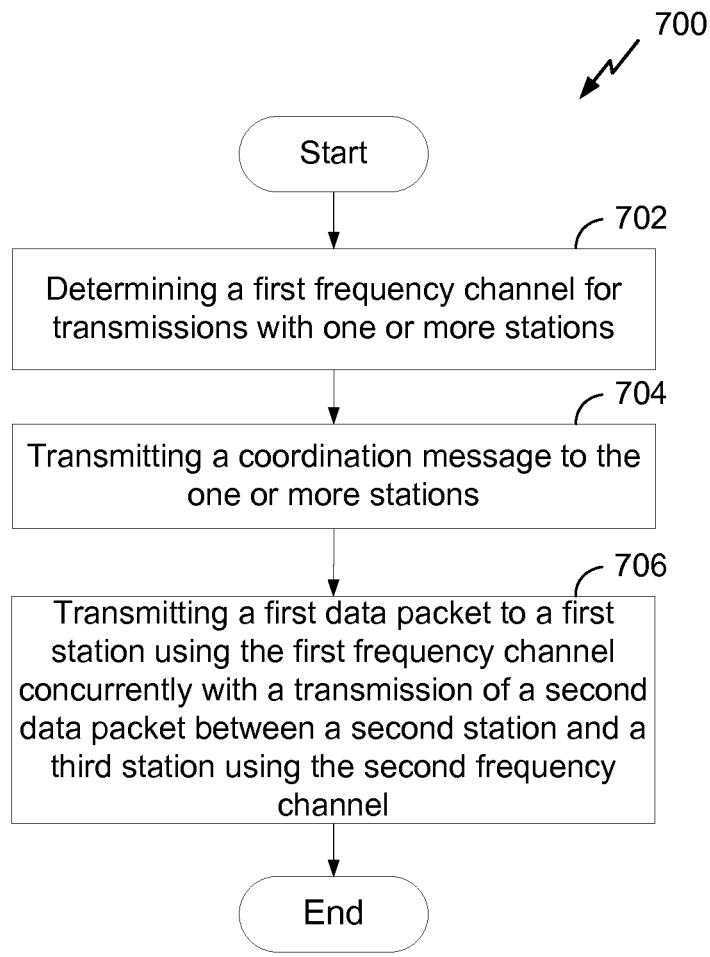
FIG. 7 is a flowchart of a process for concurrently allowing station-to-station transmissions and access point-to-station transmissions.

FIG. 7 is a flowchart of a process 700 for concurrently allowing station-to-station transmissions and access point-to-station transmissions. In an embodiment, the process 700 may be performed by an AP, such as the AP 504. At block 702, the process 700 determines a first frequency channel for transmissions with one or more STAs. At block 704, the process 700 transmits a coordination message to the one or more STAs. In an embodiment, the coordination message indicates that the first frequency channel is allocated for transmissions between an AP and the one or more STAs and that a second frequency channel is allocated for transmissions between STAs.

At block 706, the process 700 transmits a first data packet to a first STA of the one or more STAs using the first frequency channel concurrently with a transmission of a second data packet between a second STA of the one or more STAs and a third STA of the one or more STAs using the second frequency channel. After block 706, the process 700 ends.

Figure 8:
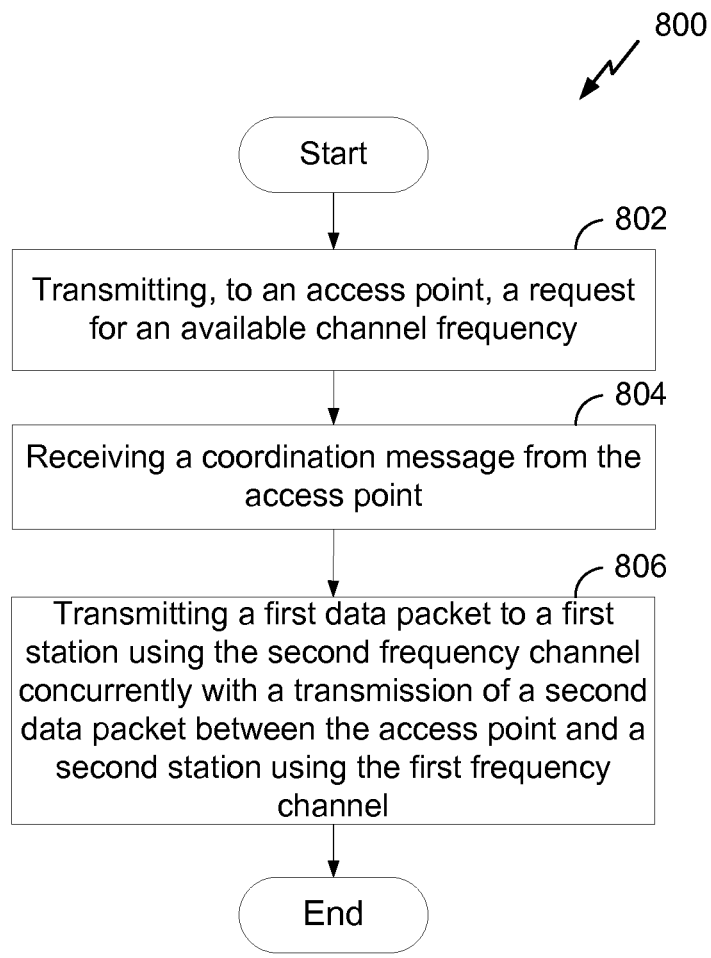
FIG. 8 is a flowchart of a process for concurrently allowing station-to-station transmissions and access point-to-station transmissions.

FIG. 8 is a flowchart of a process 800 for concurrently allowing station-to-station transmissions and access point-to-station transmissions. In an embodiment, the process 800 may be performed by a STA, such as one of the STAs 506A-F. At block 802, the process 800 transmits, to an AP, a request for an available channel frequency. At block 804, the process 800 receives a coordination message from the AP. In an embodiment, the coordination message indicates that a first frequency channel is allocated for transmissions between the AP and one or more STAs and that a second frequency channel is allocated for transmissions between STAs.

At block 806, the process 800 transmits a first data packet to a first STA of the one or more STAs using the second frequency channel concurrently with a transmission of a second data packet between the AP and a second STA of the one or more STAs using the first frequency channel. After block 806, the process 800 ends.

Figure 9:
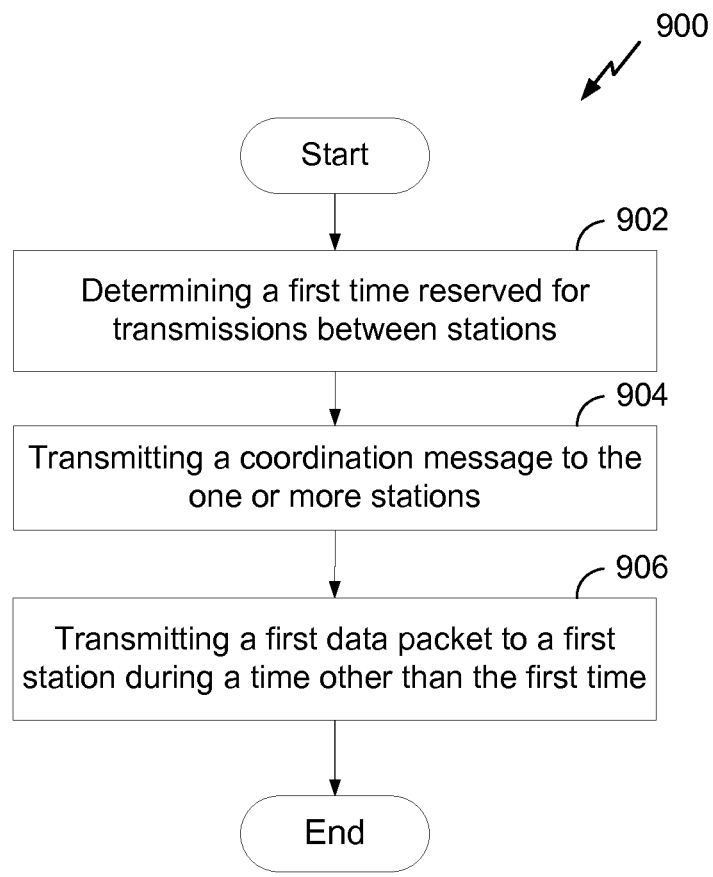
FIG. 9 is a flowchart of a process for coordinating station-to-station transmissions and access point-to-station transmissions.

FIG. 9 is a flowchart of a process 900 for coordinating station-to-station transmissions and access point-to-station transmissions. In an embodiment, the process 900 may be performed by an AP, such as the AP 504. At block 902, the process 900 determines a first time reserved for transmissions between STAs. At block 904, the process 900 transmits a coordination message to the one or more STAs. In an embodiment, the coordination message indicates that the first time is reserved for transmissions between STAs.

At block 906, the process 900 transmits a first data packet to a first STA of the one or more STAs during a time other than the first time. In an embodiment, a second STA of the one or more STAs transmits a second data packet to a third STA of the one or more STAs during the first time. After block 906, the process 900 ends.

Figure 10:
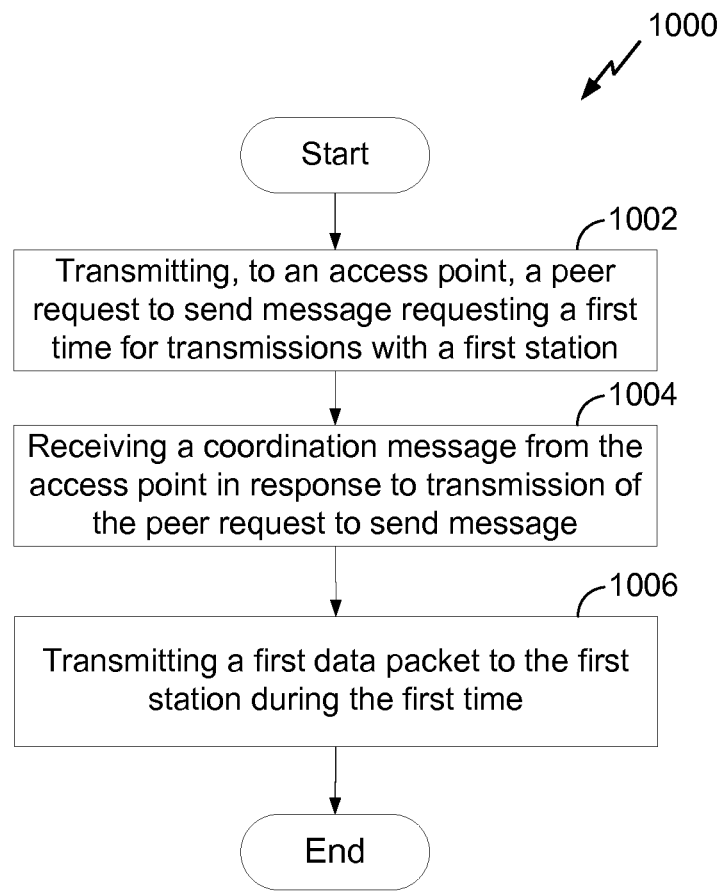
FIG. 10 is a flowchart of a process for coordinating station-to-station transmissions and access point-to-station transmissions.

FIG. 10 is a flowchart of a process 1000 for coordinating station-to-station transmissions and access point-to-station transmissions. In an embodiment, the process 1000 may be performed by a STA, such as one of the STAs 506A-F. At block 1002, the process 1000 transmits, to an AP, a peer request to send message requesting a first time for transmissions with a first STA. At block 1004, the process 1000 receives a coordination message from the AP in response to transmission of the peer request to send message. In an embodiment, the coordination message indicates that the first time is allocated for transmissions between STAs.

At block 1006, the process 1000 transmits a first data packet to the first STA during the first time. In an embodiment, the AP transmits a second data packet to a second STA during a time other than the first time. After block 1006, the process 1000 ends.

Figure 11:
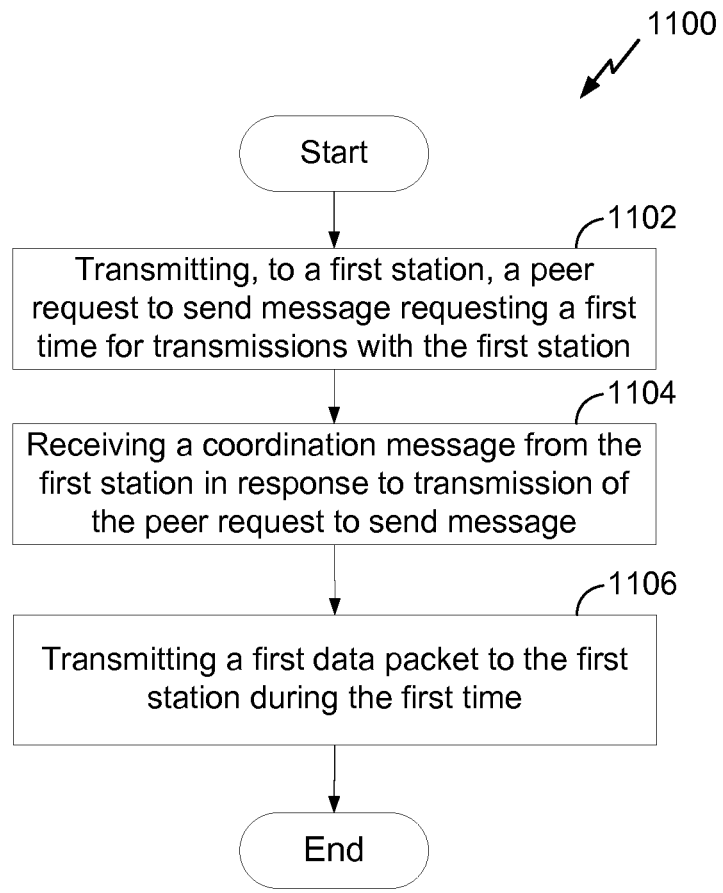
FIG. 11 is a flowchart of a process for coordinating station-to-station transmissions and access point-to-station transmissions.

FIG. 11 is a flowchart of a process 1100 for coordinating station-to-station transmissions and access point-to-station transmissions. In an embodiment, the process 1100 may be performed by a STA, such as one of the STAs 506A-F. At block 1102, the process 1100 transmits, to a first STA, a peer request to send message requesting a first time for transmissions with the first STA. At block 1104, the process 1100 receives a coordination message from the first STA in response to transmission of the peer request to send message. In an embodiment, the coordination message indicates that the first time is allocated for transmissions between STAs.

At block 1106, the process 1100 transmits a first data packet to the first STA during the first time. In an embodiment, an AP transmits a second data packet to a second STA during a time other than the first time. After block 1106, the process 1100 ends.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers. Thus, in some aspects, computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method for concurrently allowing devices to communicate, comprising:
    transmitting, by a third device to an access point, a request for an available channel frequency;
    receiving, by the third device, a coordination message from the access point, the coordination message indicating that a first frequency channel is allocated for transmissions between a first device and a second device and that a second frequency channel is allocated for transmissions between the third device and a fourth device; and
    transmitting, by the third device, a first data packet to the fourth device using the second frequency channel concurrently with a transmission of a second data packet between the first device and the second device using the first frequency channel and concurrently with a transmission of a third data packet between the third device and the access point.

2. The method of claim 1, the first device comprising the access point, the second device comprising a first station, the third device comprising a second station, the fourth device comprising a third station.

3. The method of claim 1, the first device comprising the access point, the second device comprising a first station, the third device comprising a second access point, and the fourth device comprising a second station.

4. The method of claim 1, the first frequency channel assigned for communications between the first device and the second device and the second frequency channel assigned for communications between the third device and the fourth device.

5. The method of claim 1, the transmitting a request for an available channel frequency comprising transmitting a peer request to send message requesting permission to transmit to the fourth device using the second frequency channel and a third frequency channel.

6. The method of claim 5, the receiving a coordination message comprising receiving a peer clear to send message granting permission to transmit to the fourth device using the second frequency channel and not granting permission to transmit to the fourth device using the third frequency channel.

7. The method of claim 6, the first device communicating with the second device using the third frequency channel.

8. An apparatus for concurrently allowing devices to communicate, comprising:
means for transmitting, by an apparatus to an access point, a request for an available channel frequency;
means for receiving, by the apparatus, a coordination message from the access point, the coordination message indicating that a first frequency channel is allocated for transmissions between a first device and a second device and that a second frequency channel is allocated for transmissions between the apparatus and a fourth device; and
means for transmitting, by the apparatus, a first data packet to a fourth device using the second frequency channel concurrently with a transmission of a second data packet between the first device and the second device using the first frequency channel and concurrently with a transmission of a third data packet between the apparatus and the access point.

9. The apparatus of claim 8, the first device comprising the access point, the second device comprising a first station, the apparatus comprising a second station, and the fourth device comprising a third station.

10. The apparatus of claim 8, the first device comprising the access point, the second device comprising a first station, the apparatus comprising a second access point, and the fourth device comprising a second station.

11. The apparatus of claim 8, the first frequency channel assigned for communications between the first device and the second device and the second frequency channel assigned for communications between the apparatus and the fourth device.

12. The apparatus of claim 8, the means for transmitting a request for an available channel frequency comprising means for transmitting a peer request to send message requesting permission to transmit to the fourth device using the second frequency channel and a third frequency channel.

13. The apparatus of claim 12, the means for receiving a coordination message comprising means for receiving a peer clear to send message granting permission to transmit to the fourth device using the second frequency channel and not granting permission to transmit to the fourth device using the third frequency channel.

14. The apparatus of claim 13, the first device communicating with the second device using the third frequency channel.

15. The apparatus of claim 8, the means for transmitting the request for an available channel frequency and the means for transmitting the first data packet comprising a transmitter, the means for receiving comprising a receiver.

16. A non-transitory computer-readable medium comprising code that, when executed, causes an apparatus to:
transmit, to an access point, a request for an available channel frequency;
receive a coordination message from the access point, the coordination message indicating that a first frequency channel is allocated for transmissions between a first device and a second device and that a second frequency channel is allocated for transmissions between the apparatus and a fourth device; and
transmit a first data packet to the fourth device using the second frequency channel concurrently with a transmission of a second data packet between the first device and the second device using the first frequency channel and concurrently with a transmission of a third data packet between the apparatus and the access point.

17. The medium of claim 16, the first device comprising the access point, the second device comprising a first station, the apparatus comprising a second station, and the fourth device comprising a third station.

18. The medium of claim 16, the first device comprising the access point, the second device comprising a first station, the apparatus comprising a second access point, and the fourth device comprising a second station.

19. The medium of claim 16, the first frequency channel assigned for communications between the first device and the second device and the second frequency channel assigned for communications between the apparatus and the fourth device.

20. The medium of claim 16, further comprising code that, when executed, causes an apparatus to transmit a peer request to send message requesting permission to transmit to the fourth device using the second frequency channel and a third frequency channel.

21. The medium of claim 20, further comprising code that, when executed, causes an apparatus to receive a peer clear to send message granting permission to transmit to the fourth device using the second frequency channel and not granting permission to transmit to the fourth device using the third frequency channel.

22. The medium of claim 21, the first device communicating with the second device using the third frequency channel.

23. An apparatus for concurrently allowing devices to communicate, comprising:
a transmitter configured to transmit, to an access point, a request for an available channel frequency; and
a receiver configured to receive a coordination message from the access point, the coordination message indicating that a first frequency channel is allocated for transmissions between a first device and a second device and that a second frequency channel is allocated for transmissions between the apparatus and a fourth device, the transmitter further configured to transmit a first data packet to the fourth device using the second frequency channel concurrently with a transmission of a second data packet between the first device and the second device using the first frequency channel and concurrently with a transmission of a third data packet between the apparatus and the access point.

24. The apparatus of claim 23, the first device comprising the access point, the second device comprising a first station, the apparatus comprising a second station, and the fourth device comprising a third station.

25. The apparatus of claim 23, the first device comprising the access point, the second device comprising a first station, the apparatus comprising a second access point, and the fourth device comprising a second station.

26. The apparatus of claim 23, the first frequency channel assigned for communications between the first device and the second device and the second frequency channel assigned for communications between the apparatus and the fourth device.

27. The apparatus of claim 23, the request for an available channel frequency comprising a peer request to send message requesting permission to transmit to the fourth device using the second frequency channel and a third frequency channel.

28. The apparatus of claim 27, the coordination message comprising a peer clear to send message granting permission to transmit to the fourth device using the second frequency channel and not granting permission to transmit to the fourth device using the third frequency channel.

29. The apparatus of claim 28, the first device communicating with the second device using the third frequency channel.

* * * * *